Sept. 9, 1947.   E. G. BRUNSVOLD   2,427,254
SACKED POTATO LOADING MACHINE
Filed July 10, 1945   3 Sheets-Sheet 3
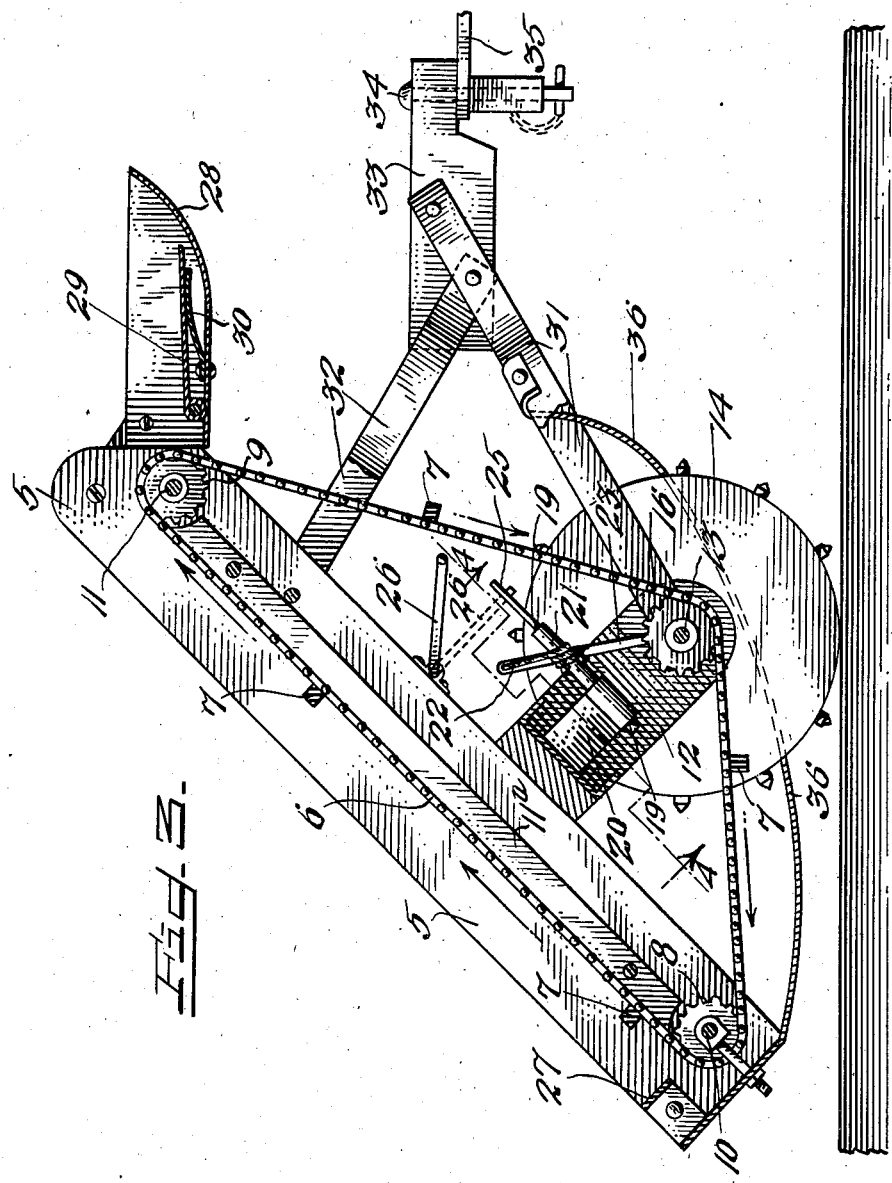
Inventor
*ERICK G. BRUNSVOLD,*
By *Clarence A. O'Brien
and Harvey B. Jacobson*
Attorneys Patented Sept. 9, 1947

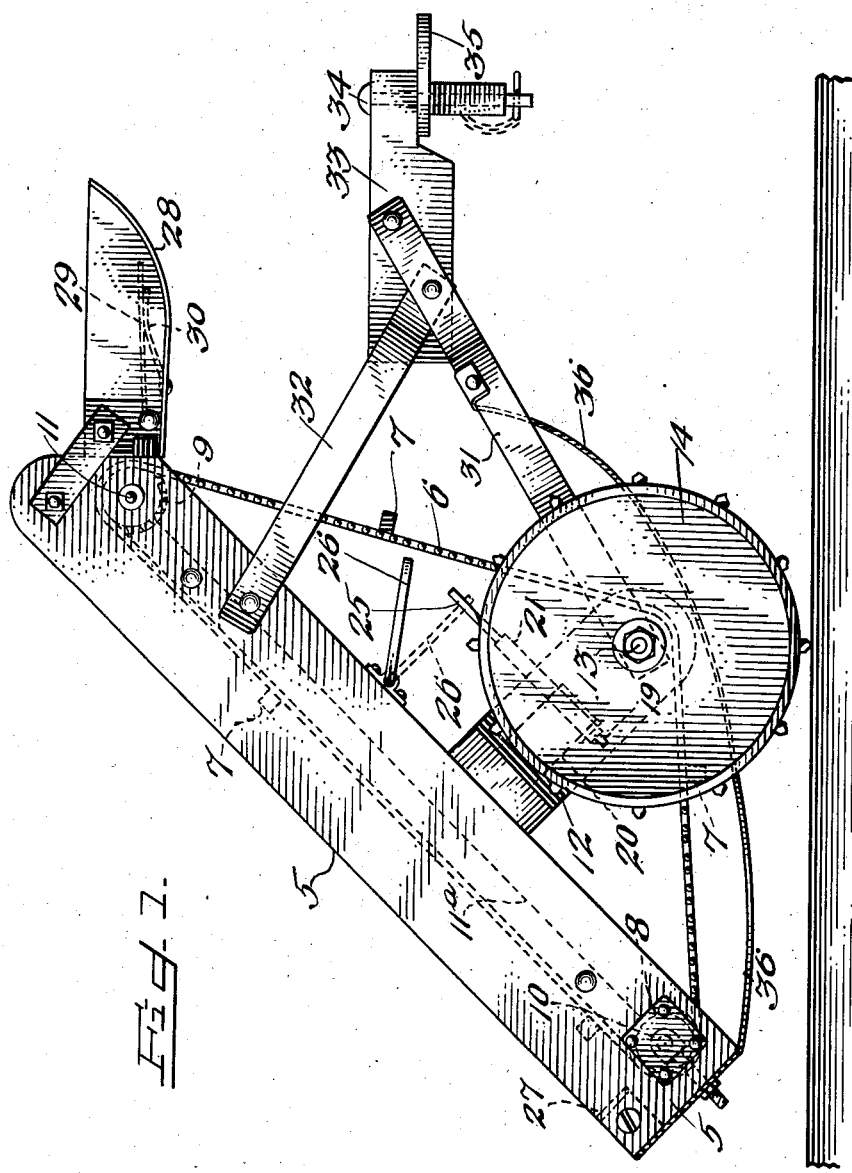

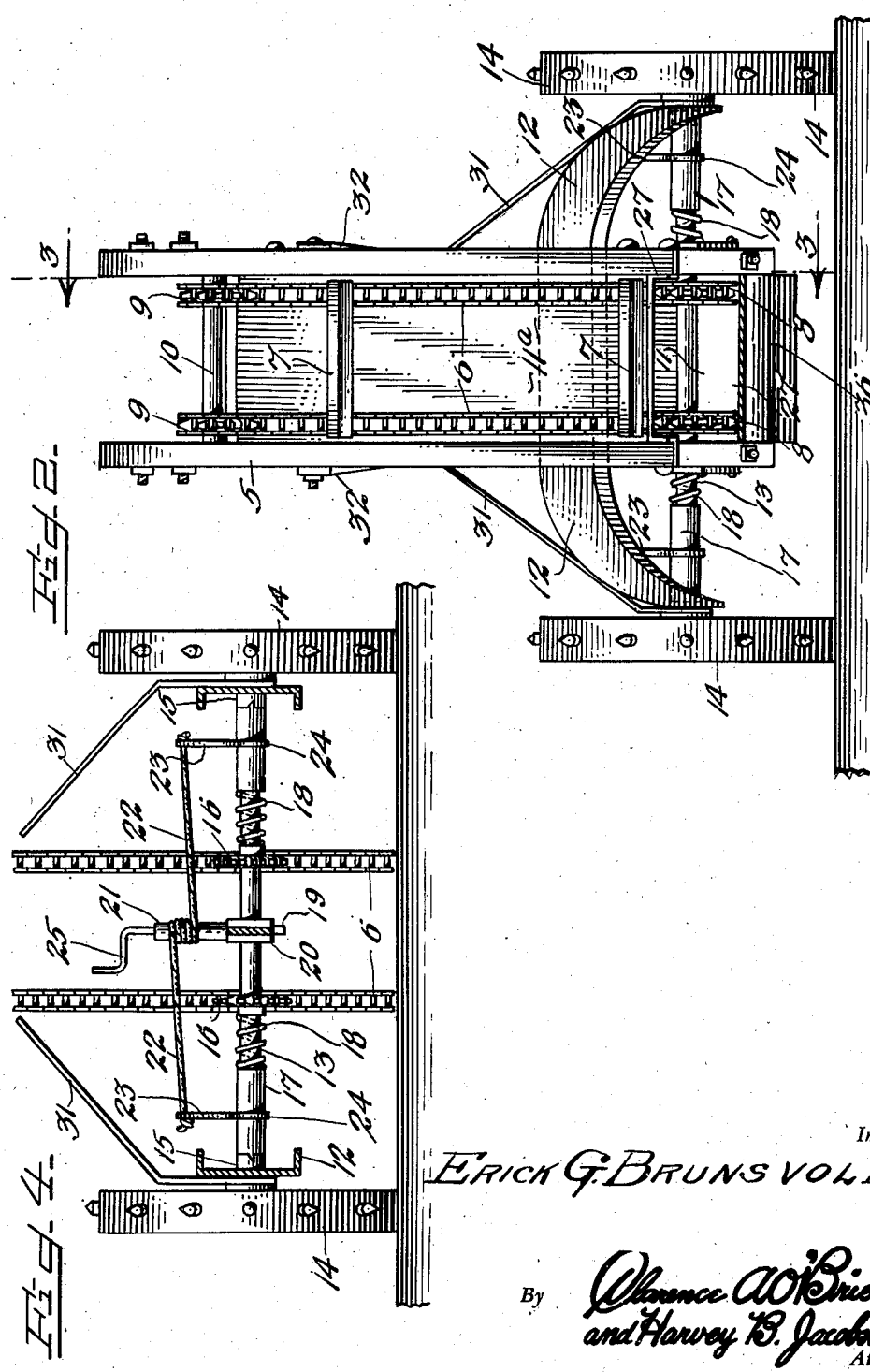

2,427,254

UNITED STATES PATENT OFFICE 2,427,254

SACKED POTATO LOADING MACHINE

Erick G. Brunsvold, Hatton, N. Dak.

Application July 10, 1945, Serial No. 604,253

2 Claims. (Cl. 214—41)

This invention relates to a loading machine adapted to be drawn along by and behind a motor truck between spaced rows of sacked potatoes for receiving and elevating the latter and thereby facilitating loading of the same into the truck.

The primary object of the present invention is to provide a loading machine of the above kind, including an inclined conveyor having an endless conveying element onto which the sacked potatoes are deposited at the rear, lower end of the conveyor and by means of which said sacked potatoes are elevated and conveyed forwardly to a position over the truck body for being deposited into the latter.

A further object of the invention is to provide a loading machine of the above kind in which the endless conveying element is driven by the traction wheels of the machine only upon forward movement of the latter, and wherein manually operable means is provided for unclutching the traction wheels from the endless conveying element so as to discontinue driving of the latter when the machine is not in use and is being transported from one point to another.

A still further object of the invention is to provide a loading machine of the above kind having a tray for receiving the sacked potatoes as they are discharged from the conveyor at the forward upper end of the latter, said receiving tray having a yieldable false bottom to absorb shock as the sacked potatoes are discharged into the tray from the conveyor.

Still another object of the invention is to provide a loading machine of the above kind which is of comparatively simple and compact construction, which is highly efficient in operation, and which is convenient and easy to use.

More specific objects and features of the invention will become apparent from the following description when considered in connection with the accompanying drawings, in which:

Figure 1 is a side elevational view of a loading machine constructed in accordance with the present invention, Figure 2 is a front elevational view thereof, Figure 3 is a longitudinal section taken substantially on the line 3—3 of Figure 2, and Figure 4 is a fragmentary section taken on line 4—4 of Figure 3.

Referring in detail to the drawings, the present invention includes an inclined conveyor embodying a frame or support 5 for an endless conveying element that comprises a pair of spaced conveyor chains 6 connected at intervals by cross-bars or cleats 7 and passing around sprocket wheels 8 and 9, respectively carried by a foot shaft 10 and a head shaft 11 disposed transversely of and at opposite ends of the frame 5. The conveyor is rigidly mounted upon a forwardly inclined wheeled support embodying an arched bolster 12 disposed transversely of the conveyor frame 5 intermediate the ends of the latter. A transverse axle 13 extends through the ends of the bolster 12 and has coaxial traction wheels 14 journaled on the projecting ends thereof. Also journaled in the ends of the bolster 12 and rotatable with the traction wheels 14 by being fixed to the hubs of the latter are inwardly projecting clutch elements 15 having clutch teeth on the inner ends thereof of ratchet formation. Disposed on the axle 13 inwardly of the clutch elements 15 are spaced sprocket wheels 16 about which the conveyor chains 6 respectively pass, and the hubs of sprocket wheels 16 are keyed to the axle 13 for driving the latter. Slidably keyed on the axle 13 between the sprocket wheels 16 and the clutch elements 15 are tubular clutch elements 17 having ratchet-like clutch teeth on their outer ends adapted to cooperate with the teeth of the elements 15. The clutch sleeves 17 are yieldingly engaged with the clutch elements 15 by means of helical compression springs 18 interposed between the inner ends of the clutch sleeves 17 and the hubs of sprocket wheels 16. The arrangement is such that the traction wheels 14 normally drive the clutch sleeves 17 so as to rotate the axle 13 and sprocket wheels 16 for driving the endless conveying element upon forward travel of the machine, the traction wheels 14 being permitted to turn freely relative to the axle 13 without driving the endless conveying element when the machine is moved backwardly, by reason of the ratchet formation of the clutch teeth on the co-acting elements 15 and sleeves 17. On the other hand, if the clutch sleeves 17 are shifted inwardly to disengage them from the elements 15, the traction wheels 14 may turn freely on the axle 13 without driving the endless conveying element, even though the machine is drawn forwardly. This permits throwing the conveyor out of operation when the machine is not in use and is being transported from one place to another. Disengagement of the clutch sleeves 17 from the clutch elements 15 is effected by a manually operable means more clearly shown in Figures 3 and 4. This means includes a shaft 19 journaled in a bearing bracket 20 rigid with and depending from the intermediate portion of bolster 12 and having a winding drum 21 secured thereon. Flexible members or cables 22 are wound in opposite directions on the drum 21 and are connected at their outer ends, respectively, to shifting arms 23 having eye portions 24 received in annular grooves of the clutch sleeves 17. In this way, the clutch sleeves 17 may revolve relative to the arms 23, but the latter may be moved inwardly to disengage said sleeves 17 from the clutch elements 15. Shaft 19 has a hand crank 25 so that the drum 21 may be rotated to wind the cables 22 thereon and cause the sleeves 17 to be shifted inwardly for disengaging them from the clutch elements 15 against the action of springs 18. A suitable swinging hasp 26 may be mounted on the underside of the conveyor frame in position to releasably engage the crank 25 so as to restrain the drum 21 against turning and thereby maintain the clutch sleeves 17 in released position. When the hasp 26 is disengaged from the crank 25, the springs 18 will automatically move the clutch sleeves 17 outwardly into engagement with the clutch elements 15, thereby causing the cables 22 to unwind from drum 21. It will thus be seen that when the clutch sleeves 17 are engaged with clutch elements 15, the endless conveying element will be properly driven from the traction wheels upon forward travel of the machine so as to cause upward and forward conveying of sacks of potatoes deposited on the endless conveying element at the rear, lower end of the conveyor. Only a few of the cross-bars or slats 7 are used, it being understood that a partition 11a is provided to properly sustain or support the sacks of potatoes as they are moved by the endless conveying element. To assist in maintaining the sacks of potatoes on the conveyor when initially deposited thereon at the rear, lower end, the conveyor frame 5 is provided, at such rear, lower end, with a transverse tail piece or partial tail gate 27.

At the forward, upper end of the conveyor is a forwardly extending, substantially horizontal receiving tray 28 onto which the sacks of potatoes are discharged from the upper end of the inclined conveyor. This tray is positioned within convenient reach of an attendant standing in the body of a truck used to tow the machine, and the attendant may then readily remove the sacks of potatoes from the tray 8 and deposit them into the body of the truck as said sacks of potatoes are successively discharged into said tray 28. In order to absorb the shock incident to discharge of the sacks of potatoes into the tray 28, the latter is provided with a hinged false bottom 29 yieldingly elevated by a spring 30 and adapted to yield downwardly under the force and weight of the discharged sacks of potatoes.

Means is provided to hitch the machine to the rear end of the towing truck, and such means is shown as comprising a pair of forwardly converging braces 31 extending forwardly and upwardly from the axle 13 at the inner sides of the wheels 14, and another pair of forwardly converging braces 32 extending forwardly and downwardly from the upper portion of the conveyor frame 5, the forward ends of said braces 31 and 32 being rigidly secured against opposite sides of a coupling block 33. Coupling block 33 has a vertical pin or bolt 34 at its forward end to facilitate connection of said block 33 with the rear end of a draw-bar 35 extending rearwardly from the towing truck. A suitable sheet metal fender of downwardly bowed form and indicated at 36 is extended under the axle 13 and parts carried thereby, and is attached at its opposite ends, respectively, to the rear end of conveyor frame 5 and to the braces 31 forwardly of the wheels 14. This protects the mechanism directly under the conveyor frame and on and above the axle 13 from detrimental effects of vegetation that might otherwise engage and clog the same when the machine is drawn over the field between the rows of sacked potatoes.

In operation, the machine is coupled to the rear end of a towing truck and hasp 26 is disengaged from crank 25 so that clutch elements 17 are engaged with the clutch elements 15. Upon forward travel of the machine, the endless conveying element of the inclined conveyor will be driven in the direction indicated by the arrows in Figure 3. As the machine moves ahead, the sacks of potatoes are deposited, one by one, by the attendant upon the rear, lower end of the conveyor. The sacks of potatoes are carried forwardly and upwardly by the endless conveying element and successively discharged into the receiving pan 28, from which they are lifted and deposited into the body of the truck by an attendant standing in the latter. In this way, the sacks of potatoes may be expeditiously loaded after being arranged in spaced rows and upon drawing the machine ahead between the rows. When the loading operation has been completed, the drum 21 may be turned to effect disengagement of clutch sleeves 17 from clutch elements 15 so that the machine may be drawn ahead without operating the endless conveyor and so as to transport the machine from one place to another. Should the machine be moved backwardly with the clutch sleeves engaged with the clutch elements 15, the traction wheels 14 will simply turn free without driving the endless conveying element.

From the foregoing description, it is believed that the construction, operation and advantages of the present invention will be readily understood and appreciated by those skilled in the art. Minor changes may be made in details illustrated and described, such as fall within the scope of the invention as claimed.

What I claim is:

1. A loading machine adapted to be drawn along by a motor truck to facilitate loading of sacked potatoes into said truck, comprising a rearwardly inclined conveyor including a frame and an endless conveying element, a wheeled support for the conveyor including an axle having coaxial traction wheels journaled on the ends thereof, sprocket wheels secured on the axle, said endless conveying element passing under said sprocket wheels in engagement with the latter, clutch elements fixed to and rotatable with the hubs of the traction wheels, clutch sleeves slidably keyed on the axle at the inner sides of the traction wheels and movable outwardly toward the traction wheels to clutch the latter to the axle, springs yieldingly engaging said clutch sleeves with the clutch elements of the traction wheels, manually operable means to simultaneously move the clutch sleeves inwardly away from the traction wheels and thereby unclutch the traction wheels from the axle, means to couple the machine to the rear end of the truck for being towed by the latter, and a sheet metal fender of downwardly bowed form attached to the conveyor frame and extended under the axle.

2. A loading machine adapted to be drawn along by a motor truck to facilitate loading of sacked potatoes into said truck, comprising a rearwardly inclined conveyor including a frame and an endless conveying element, a wheeled support for the conveyor, a receiving tray for receiving the sacked potatoes as they are discharged from the forward, upper end of the conveyor, said receiving tray being rigid with and projecting forwardly from the conveyor frame to receive the discharged sacks of potatoes in a position to be removed and deposited into the truck by an attendant standing in the latter, a vertically movable false bottom in said receiving tray, and yieldable means resisting depression of said false bottom so as to absorb shocks incident to discharge of the sacked potatoes onto said false bottom.

ERICK G. BRUNSVOLD.

REFERENCES CITED

The following references are of record in the file of this patent:

UNITED STATES PATENTS

| Number | Name | Date |
|---|---|---|
| 694,284 | Jefferson | Feb. 25, 1902 |
| 825,226 | Linden | July 3, 1906 |
| 981,440 | Llewellyn | Jan. 10, 1911 |
| 1,570,256 | Hunt | Jan. 19, 1926 |
| 1,726,604 | Amen | Sept. 3, 1929 |
| 1,853,253 | Bennett | Apr. 12, 1932 |